Oct. 7, 1947.  L. B. GREEN  2,428,419
SHAPING OR SETTING MACHINE FOR METAL BANDS OR TIRE RIMS
Filed April 3, 1944  3 Sheets-Sheet 1

INVENTOR.
LEE B. GREEN
BY
Kwis Hudson Baughton & Williams
ATTORNEYS

Oct. 7, 1947.  L. B. GREEN  2,428,419
SHAPING OR SETTING MACHINE FOR METAL BANDS OR TIRE RIMS
Filed April 3, 1944  3 Sheets-Sheet 3

INVENTOR.
LEE B. GREEN
BY Kwis Hudson
Boughton & Williams
ATTORNEYS

Patented Oct. 7, 1947

2,428,419

UNITED STATES PATENT OFFICE 2,428,419

SHAPING OR SETTING MACHINE FOR METAL BANDS OR TIRE RIMS

Lee B. Green, Lakewood, Ohio

Application April 3, 1944, Serial No. 529,392

15 Claims. (Cl. 78—15)

This invention relates to work-shaping machines and, more particularly, a novel form of machine by which a desired force or thrust can be applied to tire rims or various other metal bodies.

In the manufacture of certain metal bodies, particularly annular bodies such as tire rims, it is desirable to subject such bodies to relatively heavy forces or pressures for giving the bodies a desired accurate shape and set. As is understood by those skilled in this art, the bodies which have been thus treated are better able to retain their true shape and are less likely to become warped or twisted.

The present invention aims to provide a novel form of machine by which operations of the character mentioned can be carried out in a rapid and satisfactory manner.

Another object of this invention is to provide an improved construction for a machine of this character in which cooperating thrust elements of novel form and arrangement permit a mechanical advantage to be obtained such that relatively high pressures or forces can be quickly and directly applied to the work.

A further object of this invention is to provide an improved construction for a machine of the character mentioned, in which a combined wedging and rolling action is employed between the cooperating thrust elements.

Still another object of the present invention is to provide an improved machine of this kind, having a sectional work-shaping means and in which a circumferentially movable ring is employed for causing the desired actuation of the sections of such work-shaping means.

Yet another object of the invention is to provide a machine of the character mentioned in which tangential power means is employed for actuating said ring.

The invention can be further briefly summarized as consisting in certain novel combinations and arrangements of parts hereinafter described and particularly set out in the appended claims.

In the accompanying sheets of drawings.

Figure 1:
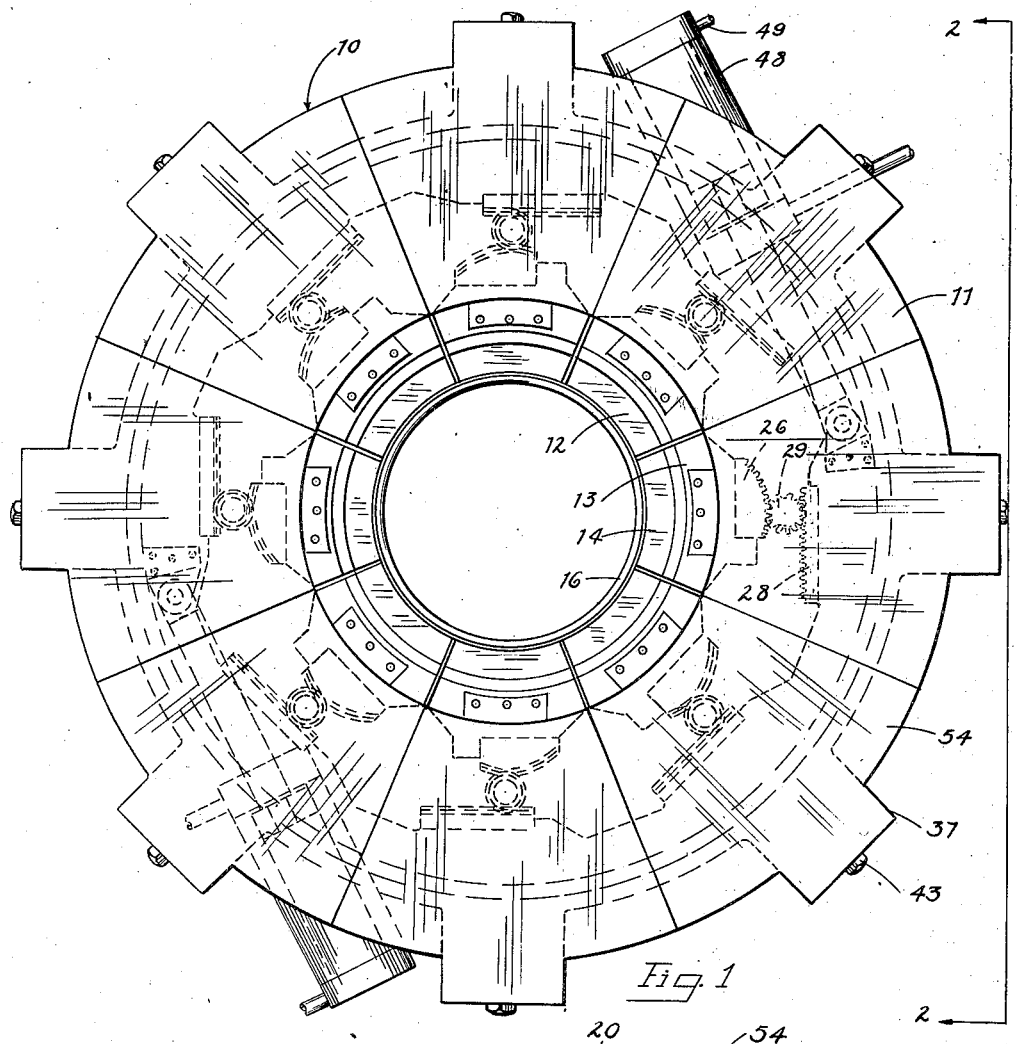
Fig. 1 is a plan view of a machine embodying the present invention.
Figure 2:
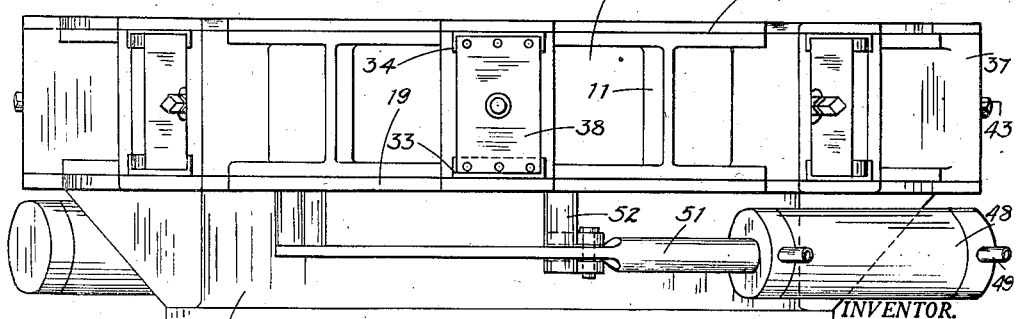
Fig. 2 is a side elevation thereof viewed as indicated by line 2—2 of Fig. 1.

Before proceeding with the detailed description of the particular form of my machine shown in the drawings, I desire it to be understood that the invention is susceptible of various changes and modifications. Likewise it should be understood that, although the machine is especially suitable for operating on annular bodies such as tire rims and is at times referred to as a "band setter," it is not limited to this particular service but can be applied to various other bodies and uses.

Figure 3:
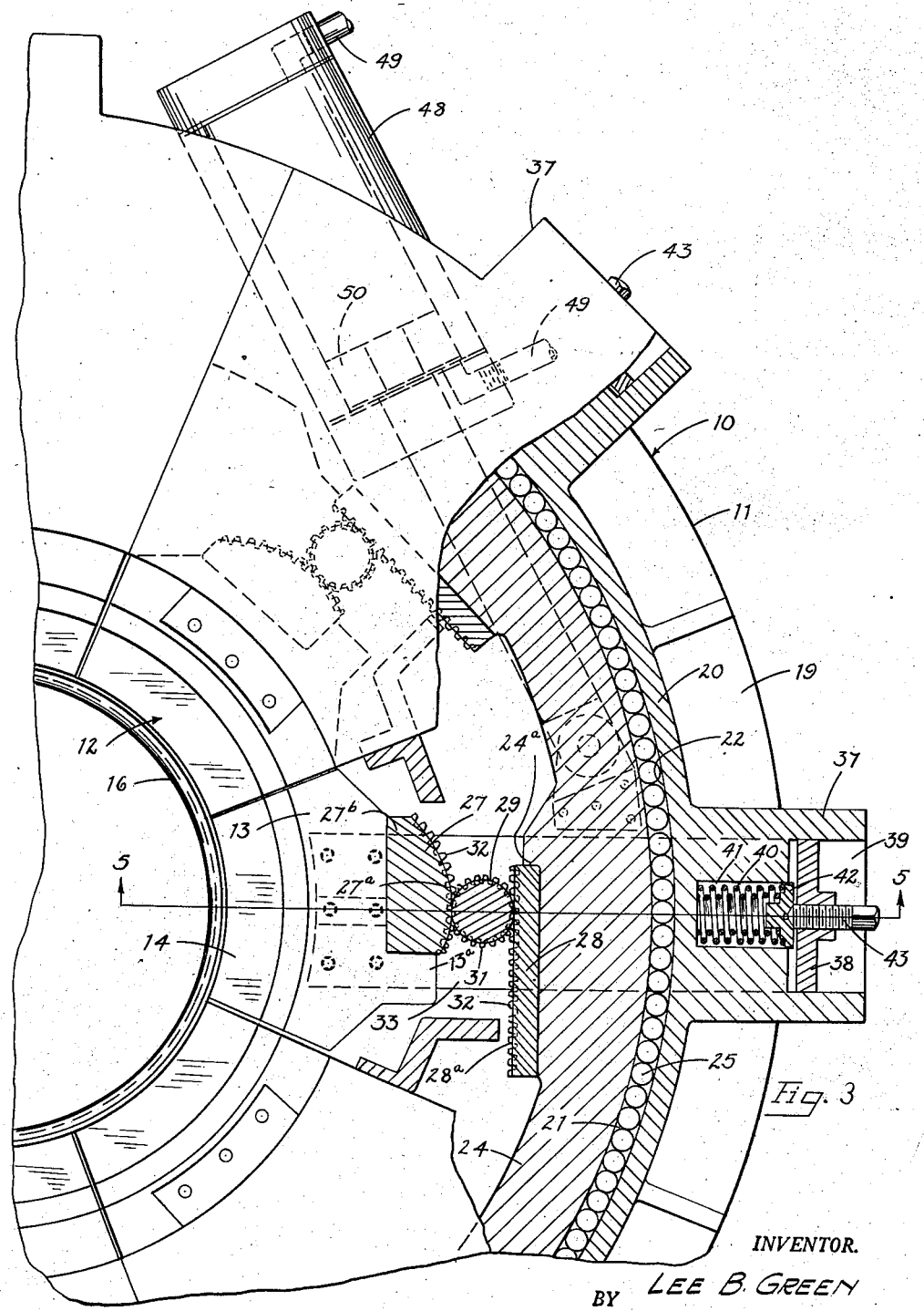
Fig. 3 is a partial plan view of the machine, on a larger scale and with portions broken away, showing the work-shaping means in its closed position.
Figure 4:
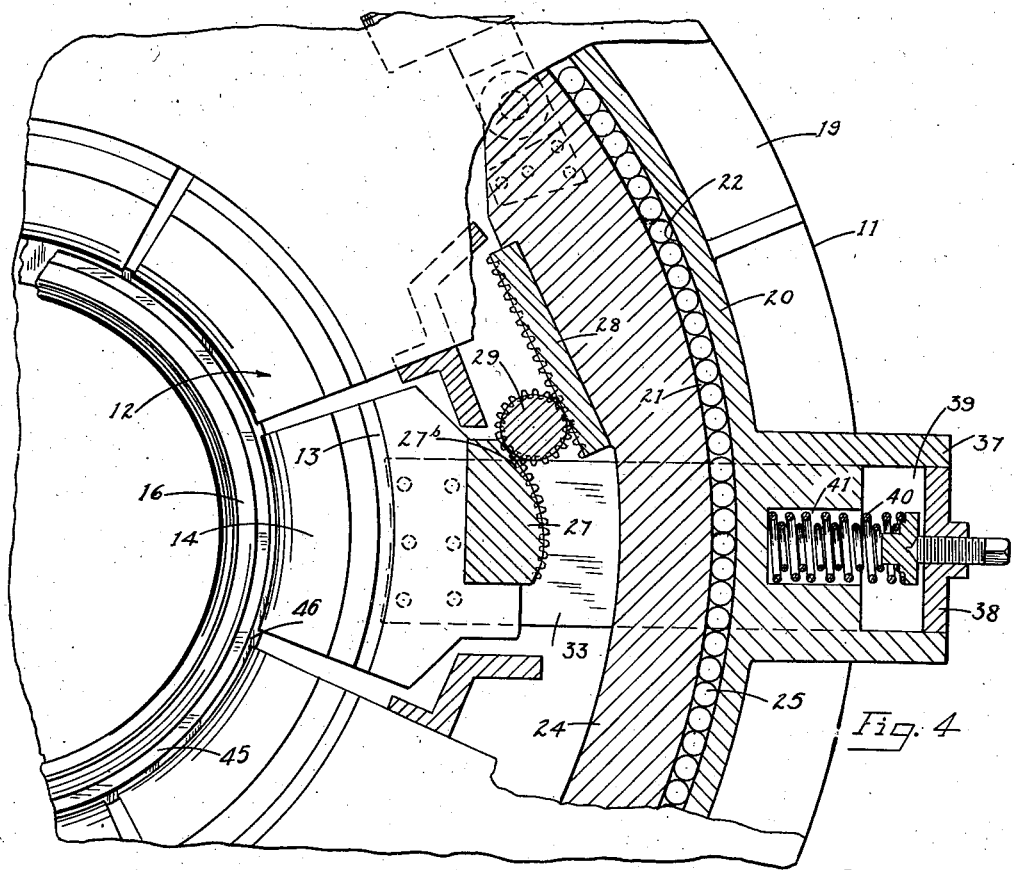
Fig. 4 is a partial plan view similar to Fig. 3 but showing the work-shaping means in its open position.

In the drawings I show the machine 10 as having a substantially ring-shaped frame 11 and an annular work-shaping means 12 located inside the frame. The work-shaping means 12 comprises a plurality of complemental arcuate members or segments 13 which are movable along substantially radial paths from a closed position as shown in Figs. 1 and 3 to an open or retracted position as shown in Fig. 4. The work-shaping means also includes a die comprising complemental sections or segments 14 which are connected respectively with the radially movable members 13, as by means of the screws 15. The die segments 14 have work-engaging faces 14a of a shape or contour corresponding with that of the work piece to be engaged which, in this instance, is a tire rim 16.

The ring-shaped frame 11 comprises a depending base or standard 18 upon which the machine rests and a pair of annularly extending lateral and upright flanges or web portions 19 and 20 connected with such base. The annular flanges 19 and 20 cooperate to form a substantially circular space or guideway 21 in the frame 11. One surface of the guideway 21 is formed by the inner face of the upright flange 20 and provides a substantially circular internal backing surface 22 to which further reference will presently be made.

The actuating means for the radially movable work-shaping members 13, and die segments 14 carried thereby, includes a member which is movable substantially transversely of the radial paths of movement of the members 13 and which, in this instance, is in the form of a ring 24. The ring 24 is arcuately or circumferentially movable in the guideway 21 of the frame 11, either in direct engagement with the backing surface 22 or, preferably, in engagement with a full annular series or substantially closed ring of contiguous anti-friction rollers 25 interposed between such ring and backing surface. For utilizing the arcuate movement of the ring 24 so as to cause actuation of the work-shaping members or segments 13 with a desired mechanical advantage, I provide cooperating substantially opposed thrust portions or elements 27 and 28 on such members and ring. Thrust transmitting rollers 29 are disposed between the paired cooperating thrust elements 27 and 28. The thrust elements 28 are mounted inside the ring 24 at circumferentially spaced points corresponding substantially with the circumferential spacing of the thrust elements 27 of the radially movable members 13.

In the arrangement just described, it will be seen that the elements 27 constitute one group or series of annularly spaced thrust elements and the elements 28 constitute another annular group of correspondingly spaced thrust elements. The interposed rollers 29 constitute a third annular group or series of thrust elements which cooperate with the elements 27 and 28 for converting the rotary or circumferential movement of the ring 24 into rectilinear or reciprocating movement of the work-shaping members 13, in a manner such that friction between the thrust elements 27 and 28 is substantially eliminated and a high mechanical advantage is obtained.

For best results the coaction obtained between the cooperating thrust elements 27, 28 and 29 should be a combined rolling and wedging action and, to this end, one set of the opposed thrust elements, preferably the thrust elements 28 carried by the ring 24, have a substantially flat working surface 28a and the set of opposed thrust elements 27 have a convexly curved tapered working surface 27a extending in the direction of the circumferential movement of the ring 24. Relative slippage between the roller 29 and the working surfaces of the thrust elements 27 and 28 is prevented by providing the roller with gear teeth 31 which mesh with gear teeth 32 provided on the thrust elements 27 and 28. As shown in Figs. 1, 3 and 4 the flat bearing elements 28 are mounted on the ring 24 so that each of these elements is relatively inclined, and with reference to the clockwise load-applying movement of the ring, it will be noted that the trailing end of each element is at a shorter radial distance from the center of the ring than its leading end. It will thus be seen that the inward movement of the segments 14 is produced, in part, by the convexly curved taper on the thrust elements 27 and in part by the inclination of the flat thrust elements 28.

The thrust elements 27, 28 and 29 are preferably hardened wear-resistant bodies. The elements 27 can be connected with the members 13 by any suitable connecting means and are preferably held against lateral shifting on such members by means of integral abutment projections 13a thereon. The thrust elements 28 likewise can be connected with the ring 24 by any suitable connecting means and are held against relative shifting along the ring by abutment projections 24a thereon.

Figure 5:
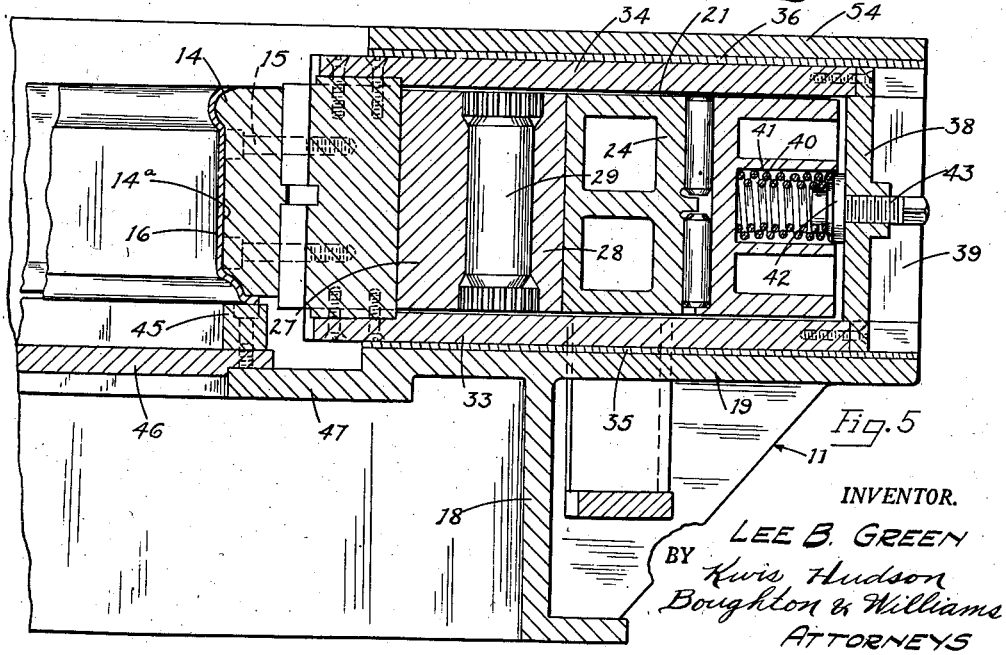
Fig. 5 is a partial transverse sectional view of the machine taken on line 5—5 of Fig. 3.

The work-shaping members 13 and the die segments 14 can be moved to their open or work-receiving position of Fig. 4 by any suitable retracting or expanding means. In this instance I show each of the members 13 as having a pair of substantially radially extending arms or drawbars 33 and 34 connected therewith and extending outwardly therefrom so as to straddle the ring 24. The pairs of arms 33 and 34 form supports or carriers for the members 13 and are slidably mounted in the frame 11 by the bearing elements 35 and 36 provided therein. At circumferentially spaced points corresponding with the locations of the work-shaping members 13, the frame 11 is provided with external radial projections 37 into which the outer ends of the arms 33 and 34 extend. As shown in Fig. 5, the bearing elements 35 and 36 are of a shape such that they define substantially radially extending guideways and the arms 33 and 34 of the work-shaping members 13 constitute guide means which are reciprocable in such guideways.

The paired arms 33 and 34 are connected at their outer ends by means of crossbars or links 38 which are radially movable in slots or recesses 39 of the frame projections 37. Compression springs 40 disposed between the frame 11 and the crossbars 38 exert an outward thrust against the latter which is transmitted through the arms 33 and 34 to the work-shaping members 13 and constantly urges the latter outwardly toward their expanded or retracted position. The springs 40 are preferably located in recesses 41 provided in the frame projections 37 with their outer ends in engagement with adjustable spring seats 42. The effectiveness of the springs 40 can be varied or adjusted by means of the adjusting screws 43 which extend through the crossbars 38 and serve to shift the spring seats 42 inwardly or outwardly as desired.

As mentioned above, Fig. 4 of the drawings shows the work-shaping members 13 and the die segments 14 in their open or retracted position and at this time, the work piece or tire rim 16 can be moved to the desired position in the segmental die. The rim can be supported in the desired position in the die by any suitable means or workholder such as the annular ring 45 upon which an edge or flange of the rim rests, as shown in Fig. 5. The work-supporting ring 45 can be carried by a plate or spider 46 which is in turn supported by an inwardly extending portion 47 of the frame 11.

When the segmental die is in its expanded or work-receiving position as above mentioned and shown in Fig. 4, the thrust elements 28 of the ring 24 occupy a relatively offset position with respect to the thrust elements 27 and, at this time, the rollers 29 engage the low side or portion 27b of the thrust elements 27. By relative arcuate movement or rotation of the ring 24, in a clockwise direction as viewed in the drawings, the thrust elements 28 are shifted from the position of Fig. 4 to the position of Fig. 3. During such shifting of the thrust elements 28, the rollers 29 traverse the working surfaces of the thrust elements 27 and 28 and the coaction of these thrust elements results in a combined wedging and rolling action by which a heavy pressure or thrust can be exerted through the members 13 to the die sections 14. Such shifting of the thrust elements 28 to substantially the position shown in Fig. 3 results in an inward radial movement or closing of the segmental die so that the desired working force will be applied to the rim 16. Arcuate movement or rotation of the ring 24 in the opposite direction shifts the thrust elements 28 back to the position of Fig. 4 which permits the segmental die 14 to be obtained by the action of the springs 40, thereby releasing the rim 16 for removal from the machine.

The above mentioned actuation of the ring 24 can be obtained by any appropriate power means and, in this instance, I show a tangential power means for this purpose comprising a pair of cylinders 48 to which hydraulic or motive fluid pressure can be supplied. The cylinders 48 are preferably double-acting cylinders having fluid supply and exhaust connections 49 at opposite ends thereof and having reciprocable pistons 50 therein to which piston rods 51 are connected. The piston rods 51 are connected with the ring 24 as by means of suitable brackets 52 depending from such ring. The cylinders 48 are suitably mounted on the frame 11 and are located so that the actuating force supplied by the pistons 50 will be applied to the ring 24 substantially tangentially thereof.

As shown in Fig. 1, the top portion of the frame 11 preferably comprises an annular series or group of segmental plates 54 which are suitably connected with the body of the frame and form a cover which extends over the cooperating thrust elements, so as to shield the latter from the entry of foreign matter and against causing personal injury. As shown in Fig. 5 the upper bearing elements 36 are carried by the cover plates 54.

From the foregoing description and the accompanying drawing it will now be readily understood that I have provided a novel form of machine by which heavy forces can be quickly and directly applied to various kinds of work pieces, and in which cooperating thrust elements of novel form and arrangement convert rotary into reciprocating motion in such a way as to obtain a high mechanical advantage.

While I have illustrated and described my novel machine in considerable detail it will be understood, of course, that I do not wish to be correspondingly limited but regard my invention as including all changes and modifications coming within the spirit of the invention and the scope of the claims.

Having thus described my invention, I claim:

1. In a machine of the character described, a ring-shaped frame, an annular group of work-shaping members reciprocable in said frame substantially radially thereof, a ring mounted for circumferential movement in said frame, and coacting means between said ring and members for converting the circumferential movement of said ring into substantially radial rectilinear movement for said members, said coacting means comprising paired convex curvingly tapered and substantially flat thrust surfaces having gear teeth thereon and rollers between such paired surfaces and having teeth meshing with said gear teeth.

2. In a machine of the character described, a frame having a backing surface thereon, a work-shaping member movable along a path substantially normal to said backing surface, a member movable along said backing surface and transversely to said path, the normally movable member and the transversely movable member having substantially opposed thrust portions thereon, a roller between said thrust portions, said thrust portions and roller having cooperating gear teeth thereon to prevent relative slippage therebetween, and means for moving said transversely movable member along said backing surface to cause thrust to be transmitted through said roller for actuating said normally movable member along said path.

3. A machine of the character described comprising, a frame having an annular portion with an inner face defining a substantially circular backing surface, a ring movable circumferentially in said annular portion and along said backing surface, a work-shaping means comprising substantially radially movable sections, said sections and ring having paired thrust portions thereon, one of the thrust portions of the pairs having a substantially flat working surface and the others having a convex curvingly tapered working surface, rollers between said paired thrust portions and cooperating with said flat and curvingly tapered working surfaces to produce a combined rolling and wedging action, said thrust portions and rollers having cooperating gear teeth thereon for preventing relative slippage, and means for imparting circumferential shifting to said ring for causing actuation of said sections substantially simultaneously.

4. A machine of the character described comprising, a frame having an annular portion with an inner face defining a substantially circular backing surface, a ring movable circumferentially in said annular portion and along said backing surface, a full annular series of contiguous anti-friction rollers between said ring and backing surface, a work-shaping means comprising substantially radially movable sections, said sections and ring having paired thrust portions thereon, one of the thrust portions of the pairs having a substantially flat working surface and the others having a convex curvingly tapered working surface, thrust rollers between said paired thrust portions and cooperating with said flat and curvingly tapered working surfaces to produce a combined rolling and wedging action, and means for imparting circumferential movement to said ring for causing actuation of said sections.

5. A machine of the character described comprising, a frame having a substantially circular backing surface thereon, a ring movable circumferentially along said backing surface, an annular group of segmental work-shaping members, said members being movable substantially radially of said frame and having spaced arms extending outwardly so as to straddle said ring, said sections and ring having paired thrust portions thereon, rollers between said paired thrust portions, and means for imparting circumferential movement to said ring for causing actuation of said sections.

6. A machine of the character described comprising, a frame having a substantially circular backing surface thereon, a ring movable circumferentially along said backing surface, an annular group of segmental work-shaping members, said members being movable substantially radially of said frame and having spaced arms extending outwardly so as to straddle said ring, said sections and ring having paired thrust portions thereon, rollers between said paired thrust portions, means for imparting circumferential movement to said ring for causing actuation of said sections in one direction, and spring means acting on the outer ends of said arms for moving said members in the opposite direction.

7. A machine of the character described comprising, a frame having a substantially circular internal backing surface therein, a ring movable circumferentially in said frame along said backing surface, a full annular series of contiguous anti-friction rollers between said ring and backing surface, a segmental annular work-shaping means in said ring comprising substantially radially movable segments, said segments having convex curvingly tapered thrust elements thereon and said ring having substantially flat thrust elements spaced therearound to lie substantially opposite said convex curvingly tapered thrust elements, thrust rollers between the paired convex curvingly tapered and flat thrust elements, said thrust elements and thrust rollers having cooperating gear teeth thereon for preventing relative slippage, and power means for imparting circumferential movement to said ring.

8. A machine of the character described comprising, a frame having a substantially circular internal backing surface therein, a ring movable circumferentially in said frame along said backing surface, a full annular series of contiguous anti-friction rollers between said ring and backing surface, a segmental annular work-shaping means in said ring and comprising substantially radially movable segments, said segments having convex curvingly tapered thrust elements thereon and said ring having substantially flat relatively inclined thrust elements spaced therearound to lie substantially opposite said convex curvingly tapered thrust elements, thrust rollers between the paired convex curvingly tapered and relatively inclined flat thrust elements, said thrust elements and thrust rollers having cooperating gear teeth thereon for preventing relative slippage, power means for imparting circumferential movement to said ring for actuating said segments in one direction, and spring-actuated means for moving said segments in the opposite direction.

9. A machine of the character described comprising, a frame having an annular portion with an inner face defining a substantially circular backing surface, a work-shaping means including substantially radially movable sections, a ring movable circumferentially in said frame along said backing surface, thrust elements on said sections each having a convexly curved taper elongated in the direction of such circumferential movement, a plurality of substantially flat thrust elements carried by said ring and spaced circumferentially therearound to lie substantially opposite the first mentioned thrust elements, floating rollers disposed between the opposed thrust elements of said sections and ring and adapted to cooperate therewith to produce a combined rolling and wedging action for moving said sections inwardly, and a power device for imparting circumferential movement to said ring.

10. A machine of the character described comprising, a frame having an annular portion with an inner face defining a substantially circular backing surface, a work-shaping means including substantially radially movable sections, a ring movable circumferentially in said frame along said backing surface, a full annular series of anti-friction rollers between said ring and backing surface, thrust elements on said sections each having a convexly curved taper elongated in the direction of such circumferential movement, a plurality of substantially flat thrust elements carried by said ring and spaced circumferentially therearound to lie substantially opposite the first mentioned thrust elements, floating rollers disposed between the opposed thrust elements of said sections and ring and adapted to cooperate therewith to produce a combined rolling and wedging action for moving said sections inwardly, and a power device for imparting circumferential movement to said ring.

11. A machine of the character described comprising, a frame having an annular portion with an inner face defining a substantially circular backing surface, a work-shaping means including substantially radially movable sections, a ring movable circumferentially in said frame along said backing surface, thrust elements on said sections each having a convexly curved taper of increasing radial height in the load-applying direction of the circumferential movement of said ring, a plurality of substantially flat thrust elements carried by said ring and spaced circumferentially therearound to lie substantially opposite the curved thrust elements, said flat thrust elements being relatively inclined so that their leading edges are at a greater distance from the center of said ring than their trailing edges for said load-applying circumferential movement of the ring, rollers disposed between the opposed thrust elements of said sections and ring and adapted to cooperate therewith to produce a combined rolling and wedging action for moving said sections inwardly, and a power device for imparting circumferential movement to said ring.

12. A machine of the character described comprising, a frame having an annular portion with an inner face defining a substantially circular backing surface, a work-shaping means including substantially radially movable sections, a ring movable circumferentially in said frame along said backing surface, thrust elements on said sections each having a convexly curved taper of increasing radial height in the load-applying direction of the circumferential movement of said ring, a plurality of substantially flat thrust elements carried by said ring and spaced circumferentially therearound to lie substantially opposite the curved thrust elements, said flat thrust elements being relatively inclined so that their leading edges are at a greater distance from the center of said ring than their trailing edges for said load-applying circumferential movement of the ring, rollers disposed between the opposed thrust elements of said sections and ring and adapted to cooperate therewith to produce a combined rolling and wedging action for moving said sections inwardly, cooperating gear teeth on said thrust elements and rollers for preventing relative slippage, and a power device for imparting circumferential movement to said ring.

13. A machine of the character described comprising, an annular frame having a substantially circular backing surface thereon and also having annularly spaced substantially radially disposed guideways extending transversely of said circular backing surface, an annular group of sections located in substantially concentric relation to said backing surface and constituting an expansible and contractible work-shaping means, an actuating ring arcuately movable on said frame and having a substantially circular bearing surface spaced from and coextensive with said circular backing surface, spaced arms connected with said sections and extending therefrom so as to straddle said ring and being operable in said guideways, rollers disposed between said backing and bearing surfaces, and thrust transmitting mechanisms disposed between said ring and the sections of said work-shaping means and being operable to cause expansion and contraction of the work-shaping means in response to said arcuate movement of said ring.

14. A machine of the character described comprising, an annular frame having a substantially circular backing surface thereon and also having annularly spaced substantially radially disposed guideways extending transversely of said circular backing surface, an annular group of sections in substantially concentric relation to said backing surface and constituting an expansible and contractible work-shaping means, an actuating ring arcuately movable on said frame and having a substantially circular bearing surface spaced from and coextensive with said circular backing surface, spaced arms connected with said sections and extending therefrom so as to straddle said ring and being operable in said guideways, rollers disposed between said backing and bearing surfaces, and thrust transmitting mechanisms disposed between said ring and the respective sections of said work-shaping means and being operable to cause expansion and contraction of the work-shaping means in response to said arcuate movement of said ring, and a substantially tangentially acting power cylinder operably connected with said frame and ring for imparting said arcuate movement to the latter.

15. A machine of the character described comprising, an annular frame having a substantially circular backing structure thereon and also having annularly spaced guideways extending in substantially radial relation to said backing structure, an annular group of sections located in substantially concentric relation to said backing structure and constituting an expansible and contractible work-shaping means, an actuating ring arcuately movable on said frame and being supportingly guided by said backing structure during said movement, annularly spaced pairs of guide members connected with the respective sections of said work-shaping means and extending therefrom so as to straddle said ring and being operable in said guideways, and annularly spaced thrust transmitting mechanisms disposed between said ring and the respective sections of said work-shaping means and being operable to cause expansion and contraction of the work-shaping means in response to said arcuate movement of said ring.

LEE B. GREEN.

REFERENCES CITED

The following references are of record in the file of this patent:

UNITED STATES PATENTS

| Number | Name | Date |
|---|---|---|
| 1,496,583 | Lukes | June 3, 1924 |
| 1,433,880 | Fancher et al. | Oct. 31, 1922 |
| 1,375,334 | Strong et al. | Apr. 19, 1921 |
| 463,978 | Allen | Nov. 24, 1891 |
| 996,777 | Linnartz | July 4, 1911 |
| 772,403 | Cederstrom | Oct. 18, 1904 |
| 2,140,303 | Swanson | Dec. 13, 1938 |
| 1,176,370 | Kruse | Mar. 21, 1916 |